United States Patent
Paszicsnyek et al.

(10) Patent No.: US 12,531,144 B2
(45) Date of Patent: Jan. 20, 2026

(54) SYSTEM AND METHOD FOR FUNCTIONAL STABILITY PLANNING OF REPLACEMENT JOINTS

(71) Applicant: Medfit International AG, Kapfenberg (AT)

(72) Inventors: Thomas Paszicsnyek, Bruck/Mur (AT); Bernardo Innocenti, Brussels (BE)

(73) Assignee: Medfit International AG, Kepfenberg (AT)

(*) Notice: Subject to any disclaimer, the term of this patent is extended or adjusted under 35 U.S.C. 154(b) by 838 days.

(21) Appl. No.: 17/716,500

(22) Filed: Apr. 8, 2022

(65) Prior Publication Data
US 2022/0336079 A1 Oct. 20, 2022

Related U.S. Application Data

(60) Provisional application No. 63/176,405, filed on Apr. 19, 2021, provisional application No. 63/176,079, filed on Apr. 16, 2021.

(51) Int. Cl.
*G16H 20/40* (2018.01)
*A61B 5/00* (2006.01)
*A61B 34/10* (2016.01)

(52) U.S. Cl.
CPC ........... *G16H 20/40* (2018.01); *A61B 5/4528* (2013.01); *A61B 34/10* (2016.02); *A61B 2034/102* (2016.02); *A61B 2034/108* (2016.02)

(58) Field of Classification Search
CPC ................ A61B 5/4519; A61B 5/4528; A61B 5/4566–5/4595; A61B 34/10;
(Continued)

(56) References Cited

U.S. PATENT DOCUMENTS

| 10,004,455 B2* | 6/2018 | Senanayake | A61B 5/0077 |
| 2016/0140866 A1* | 5/2016 | McGuire | A61B 5/6804 434/247 |

(Continued)

FOREIGN PATENT DOCUMENTS

| GB | 2587184 | 3/2021 |
| WO | 2020008270 | 1/2020 |

OTHER PUBLICATIONS

PCT International Search Report and Written Opinion for International Application No. PCT/IB2022/000242, Sep. 12, 2022, 12 pages.

*Primary Examiner* — Alex M Valvis
(74) *Attorney, Agent, or Firm* — Meister Seelig & Fein PLLC

(57) ABSTRACT

A method and system for guiding joint replacement procedures based on functional stability analysis of a joint. The method comprises communicatively connecting to a plurality of sensors worn by an individual at muscles in a joint area and performing an initial measurement that evaluates strength and activity level of the muscles. The initial measurement includes a recording of data values from the plurality of sensors during a preoperative testing procedure. The initial measurement is compared with reference data, wherein the reference data includes measurements of healthy people with normal muscle function. The method further comprises generating joint replacement recommendations based on the comparison.

19 Claims, 5 Drawing Sheets

(58) Field of Classification Search
CPC ........ A61B 2034/101; A61B 2034/102; A61B 2034/105; A61B 2034/108; A61B 5/6804; A61B 5/6805; A61B 5/4533; A61B 5/4538; G16H 20/40
See application file for complete search history.

(56) References Cited

U.S. PATENT DOCUMENTS

| | | | | |
|---|---|---|---|---|
| 2016/0202755 | A1* | 7/2016 | Connor | G06F 3/011 |
| | | | | 73/865.4 |
| 2016/0338644 | A1* | 11/2016 | Connor | A61B 5/1126 |
| 2019/0231431 | A1* | 8/2019 | Paszicsnyek | A61B 6/505 |
| 2019/0298998 | A1* | 10/2019 | Coleman | G16H 40/67 |
| 2020/0260993 | A1 | 8/2020 | Ronchi | |

* cited by examiner

| Proposed Implants | PS |
|---|---|
| Size Femur | 5 |
| Size Tibia | 5 |
| Thickness Inlay | 10 |

| Value | Preop | Postop |
|---|---|---|
| LDFA | 93° | 87° |
| MPTA | 92° | 87° |
| Joint angle | 7° | 2° |
| Coronal alignment | Varus 9° | Varus 1° |

FIG. 4

SYSTEM AND METHOD FOR FUNCTIONAL STABILITY PLANNING OF REPLACEMENT JOINTS

CROSS REFERENCE TO RELATED APPLICATION

This application claims the priority of U.S. Provisional Application No. 63/176,079, entitled "SYSTEM AND METHOD FOR FUNCTIONAL STABILITY PLANNING OF REPLACEMENT JOINTS," filed on Apr. 16, 2021; and U.S. Provisional Application No. 63/176,405, entitled "SYSTEM AND METHOD FOR FUNCTIONAL STABILITY PLANNING OF REPLACEMENT JOINTS," filed on Apr. 19, 2021, the disclosures of which are hereby incorporated by reference in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to joint functionality, and in particular, analyzing joint stability geometry and functional abilities of the individual to aid in orthopedic surgical procedures.

Description of the Related Art

Joint replacement surgeries have been performed for all major and some minor joints for decades. In the beginning, only the replacement of the surface was done and little to no attention was paid to the surrounding functional structures. Within the last decade, more and more surgeons have recognized that the collaboration between these structures is key to successful joint replacement. The functionality of joints is based on different support components: bone with articular surfaces covered with cartilage, capsule, ligaments and muscle envelope. Together, these components provide proper functionality of a joint. This condition is valid on all major and minor joints, only the importance of specific components are different. By example, for the function of a knee, the primary stabilizing system is ligaments, secondarily supported by the muscle envelope. Whereas in the hip joint, the muscle envelope is primarily responsible for the functionality and the capsule is secondary.

Several devices have been developed to assist surgeons in proper placement of joint implants, but only a few tools exist that assess functional behavior of the joint implants. One existing system that evaluates joint implant functional behavior is the "Optimized Positioning System" by Corin, which calculates the correct implant position based on dynamic x-rays. However, such a system is an indirect way to assess functionality. There is thus a need for a system that evaluates the leading parts of joint stability and guides surgeons on how to replace the joint surfaces/joint during orthopedic surgical procedures.

SUMMARY OF THE INVENTION

The present invention provides a method and system for guiding joint replacement procedures based on functional stability analysis of a joint. According to one embodiment, the method comprises communicatively connecting to a plurality of sensors worn by an individual at muscles in a joint area and performing an initial measurement that evaluates strength and activity level of the muscles. The initial measurement includes a recording of data values from the plurality of sensors during a preoperative testing procedure. The initial measurement is compared with reference data, wherein the reference data includes measurements of healthy people with normal muscle function. The method further comprises generating joint replacement recommendations based on the comparison.

The joint replacement recommendations may include one or more of ideal joint planes, alignment, cutting planes, and implant types and sizes. A personalized avatar of the joint area may be generated. The personalized avatar may include a preoperative view based on the initial measurement and the comparison. The personalized avatar may also include postoperative views based on the joint replacement recommendations. The sensors may comprise a shirt, sleeves, or stocks including inwoven electromyography sensors that measure electrical signals generated by the muscles and gyro sensors for movement detection. The sensors can be worn on the muscles in the joint area at an affected limb and at a contralateral limb. The sensors may further comprise a belt including an embedded receiver that wirelessly connects, for example, via Bluetooth, WLAN, or directly to a client device for communicating data from the sensors. Comparing the initial measurement with the reference data may further comprise determining a control cohort divided in different age group, and formulating an algorithm for calculating average values of muscle activities in the patient's age. The method may further comprise transmitting the data values and the joint replacement recommendations to a three-dimensional orientation system.

According to one embodiment, the system comprises a processor and a memory having executable instructions stored thereon that when executed by the processor cause the processor to communicatively connect to a plurality of sensors worn by an individual at muscles in a joint area and perform an initial measurement that evaluates strength and activity level of the muscles. The initial measurement includes a recording of data values from the plurality of sensors during a preoperative testing procedure. The processor is further configured to compare the initial measurement with reference data, wherein the reference data includes measurements of healthy people with normal muscle function, and generate joint replacement recommendations based on the comparison.

The joint replacement recommendations may include one or more of ideal joint planes, alignment, cutting planes, and implant types and sizes. The processor may be configured to generate a personalized avatar of the joint area. The personalized avatar may include a preoperative view based on the initial measurement and the comparison. The personalized avatar may further include postoperative views based on the joint replacement recommendations. The sensors may comprise a shirt, sleeves, or stocks including inwoven electromyography sensors that measure electrical signals generated by the muscles and gyro sensors to detect motion for gait analysis. The sensors can be worn on the muscles in the joint area at an affected limb and at a contralateral limb. The processor is further configured to compare the initial measurement with the reference data by communicating with a server configured to determine a control cohort divided in different age group, and formulate an algorithm for calculating average values of muscle activities in the patient's age. The processor may be further configured to transmit the data values and the joint replacement recommendations to a three-dimensional orientation system.

BRIEF DESCRIPTION OF THE DRAWINGS

The invention is illustrated in the figures of the accompanying drawings which are meant to be exemplary and not limiting, in which like references are intended to refer to like or corresponding parts.

FIGS. 4 and 5 illustrate exemplary validation user interfaces according to an embodiment of the present invention.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses a system for assessing joint stability and replicating the stability in joint replacement surgery. The disclosed system combines proper implant position and functional matching to achieve joint replacements that are satisfactory in performance. The disclosed system may comprise a computing system that acquires muscular data to perform gait analysis and load distribution analysis for configuring the optimal postoperative treatment protocols in accordance with individual capabilities and muscle function.

Figure 1:
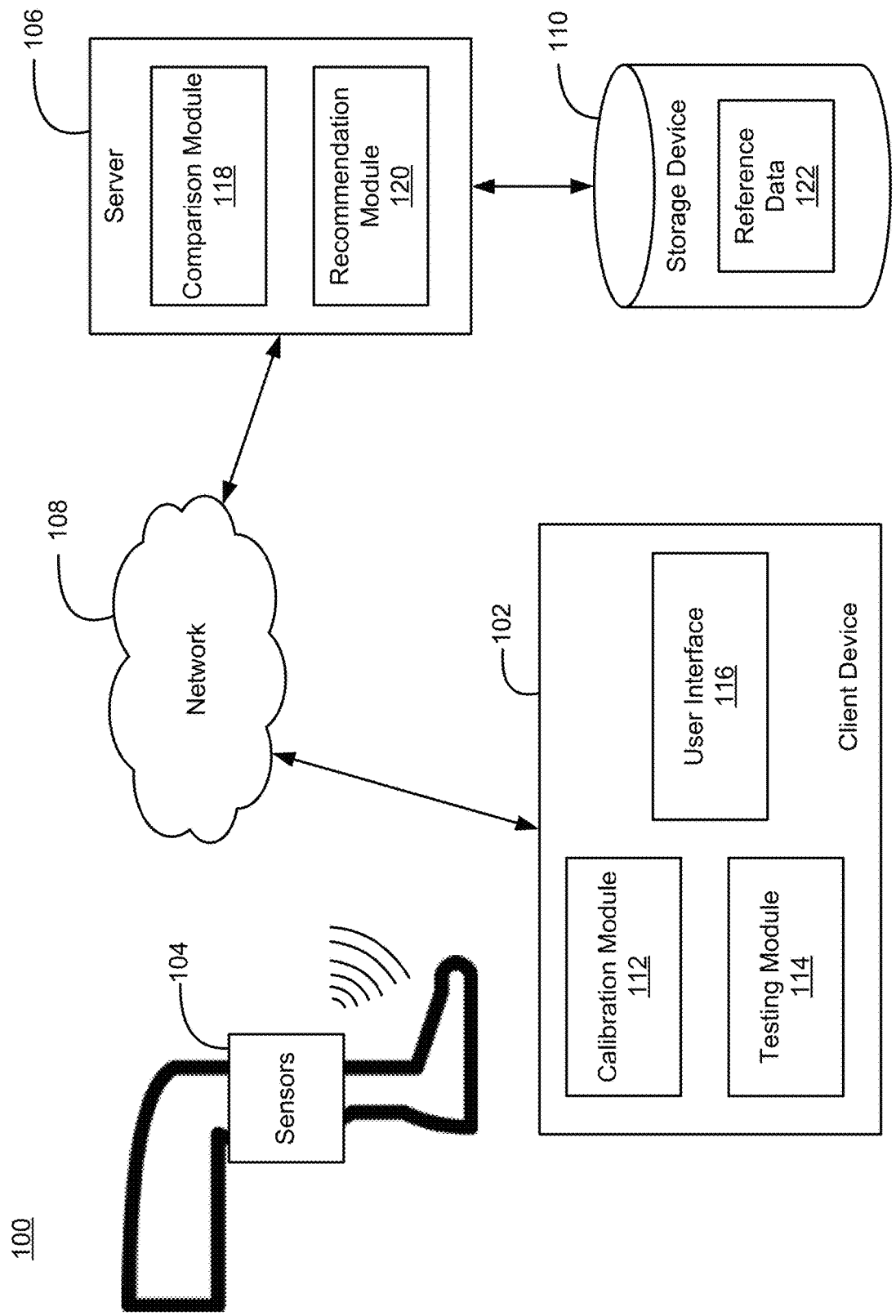
FIG. 1 illustrates a computing system according to an embodiment of the present invention.

FIG. 1 presents a computing system according to an embodiment of the present invention. The system 100 presented in FIG. 1 includes client device 102, sensors 104, server 106, network 108, and storage device 110. Client device 102 may comprise a computing device (e.g., desktop computer, television device, laptop, personal digital assistant (PDA), smartphone, tablet computer, e-book reader, smart watch and smart wearable devices, or any computing device having a central processing unit and memory unit capable of connecting to a network). The client device 102 may also comprise a graphical user interface (GUI) or a browser application provided on a display (e.g., monitor screen, LCD or LED display, projector, etc.). Client device 102 may include or execute a variety of operating systems, including a personal computer operating system, such as a Windows, Mac OS or Linux, or a mobile operating system, such as iOS, Android, or Windows Phone, or the like. The client device 102 may include or may execute a variety of possible applications, such as a client software application enabling communication with other devices.

Sensors 104 may comprise a shirt (e.g., for upper limbs and vertebral column), fabric sleeves or stockings (e.g., for lower limbs) with inwoven electromyography ("EMG") sensors that measure electrical signals generated by muscle cells when electrically or neurologically activated and gyro sensors to detect movement for gait analysis. The sensors may further comprise a belt including an embedded receiver that wirelessly connects, for example, via Bluetooth, WLAN, or directly to a client device for communicating data from the sensors. The electrical signals can be analyzed to detect abnormalities or used to analyze biomechanical movement. The sensors 104 may be placed according to a tested joint of a patient near a beginning and ending of a key muscle structure. According to one embodiment, a pair of sleeves including the sensors 104 may be worn, e.g., one on the affected limb and one on the contralateral limb, or one for each anatomical left and right body part pair. As such, a comparison may be made of the individual situation within the patient.

The sensors 104 may further include RFID sensors, a control unit, and a central processing unit for pre-calculating data values based on the electrical signals and data from the gyroscopic and RFID sensors. The pre-calculated data values may be sent by the sensors 104 to an application on client device 102 where the data values may be combined with x-rays and evaluation tables including patient information. The sensors 104 may communicate the data values to client device 102 via a wireless communication connection, such as by Bluetooth, Wi-Fi, or near-field communication (NFC). Data values received by the client device 102 may be used to generate individual demands and expectations of the result of a replacement procedure which may be used to help a surgeon in planning the replacement procedure as well as to inform the patient about obtainable targets (e.g., demand and expectation scores can be evaluated to avoid irrational expectations of the patient).

Client device 102 may include a calibration module 112, testing module 114, and user interface 116. Calibration module 112 may include logic for executing calibration procedures with the sensors 104 by instructing a user through user interface 116 to perform several operations such as, moving forward and backward, flexing and extending a joint attached to the sensor, or rotating the joint. The calibration module 112 may guide positioning of the sensors 104 to ensure consistent measurement results that can be compared with data from reference data 122.

Testing module 114 may include software or programming including testing procedures for measuring or evaluating the operation, strength and activity level (e.g., EMG) of key muscle structures of the joint measured by the sensors 104, which collectively represent functional stability of the joint. According to one embodiment, the system may further include additional equipment to gather information such as, gait analysis, load distribution analysis, and motion analysis. Exemplary equipment may include special cameras and insoles employed to gather the information. For example, gait analysis, load distribution analysis, and motion analysis may include monitoring data from insoles worn by an individual and capturing movement during a walking procedure, treadmills, and load platforms.

A preoperative testing procedure may be performed by testing module 114 to evaluate the function of an affected joint with dynamic testing (e.g., walking on a treadmill, climbing the stairs, activating the muscles against resistance). Initial measurement data may be gathered by testing module 114 using the preoperative testing procedure. The initial measurement data may comprise a recording of data values received from the sensors 104 during the preoperative testing procedure. The client device may compare the initial measurement data with reference data 122 by transmitting the initial measurement data to a comparison module 118 at server 106.

Comparison module 118 may comprise artificial intelligence or computing logic configured to compare the initial measurement data with reference data 122 stored in storage device 110. Reference data 122 may be accessed by client device 102 through server 106 over network 108, for example, as a cloud-based service, or a service subscription. The reference data 122 may comprise data of healthy people with normal muscle function that can be compared with the data values from the sensors 104. Comparing the initial measurement data with the reference data 122 may further include determining a control cohort divided in different age groups and formulating an algorithm for calculating average values of muscle activities in the patient's age. Results of the comparison made by comparison module 118 may be transmitted to the client device 102.

The client device 102 may further generate recommendations based on the comparison by referencing recommendation module 120. The recommendation module 120 may generate joint replacement options by determining and/or calculating one or more of ideal joint planes, alignment, cutting planes, implant types and sizes that are individualized to the patient based on the comparison (e.g., the average values of muscle activities in the patient's age) to regain full functionality and range of motion. Deformities and pain restricted movement factors may also be provided by the client device 102 to be considered in generating the joint replacement options by the recommendation module 120.

The joint replacement options may be transmitted to the client device 102 and used to generate a personalized avatar of the affected joint along with the results of the comparison from comparison module 118. The personalized avatar may include a preoperative view based on the initial measurement data, comparison, and optionally preoperative x-rays. The personalized avatar may further include postoperative views comprising recommendations based on the joint replacement options. The initial measurement data, recommendations, and avatar may be rendered by the client device 102 on the user interface 116.

The data values and recommendations may be transmitted to a three-dimensional orientation system for validating intra-operative procedure and correct positioning by a surgeon. Further details of the three-dimensional orientation system is described in commonly owned U.S. patent application Ser. No. 16/904,823, entitled "THREE-DIMENSIONAL ORIENTATION SYSTEM AND METHOD FOR ORTHOPEDIC SURGERY," which is herein incorporated by reference in its entirety. Alternatively, if a three-dimensional orientation system is not used, values for a cutting plane may be determined and displayed together with the recommended implants including sizes and diameters.

The disclosed system may be further complemented by a dynamic ligament balancing system that can be used to perform functional stability preoperative planning in accordance with soft tissue considerations. A dynamic ligament balancing system is described in further detail in commonly owned U.S. Patent Application No. 63/173,626, entitled "SYSTEM AND METHOD FOR DYNAMIC LIGAMENT BALANCING FOR IMPLANTING KNEE PROSTHESIS," which is herein incorporated by reference in its entirety.

Server 106, as described herein, may vary widely in configuration or capabilities but is comprised of at least a special-purpose digital computing device including at least one or more central processing units and memory. The server 106 may also include one or more of mass storage devices, power supplies, wired or wireless network interfaces, input/output interfaces, and operating systems, such as Windows Server, Mac OS X, Unix, Linux, FreeBSD, or the like. In an example embodiment, server 106 may include or have access to memory for storing instructions or applications for the performance of various functions and a corresponding processor for executing stored instructions or applications. For example, the memory may store an instance of the server 106 configured to operate in accordance with the disclosed embodiments.

Network 108 may be any suitable type of network allowing transport of data communications across thereof. The network 108 may couple devices so that communications may be exchanged, such as between servers and client devices or other types of devices, including between wireless devices coupled via a wireless network, for example. Network 108 may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client device 102 may be encrypted using, for example, the Advanced Encryption Standard (AES) with a 128, 192, or 256-bit key size, or any other encryption standard known in the art.

Figure 2:
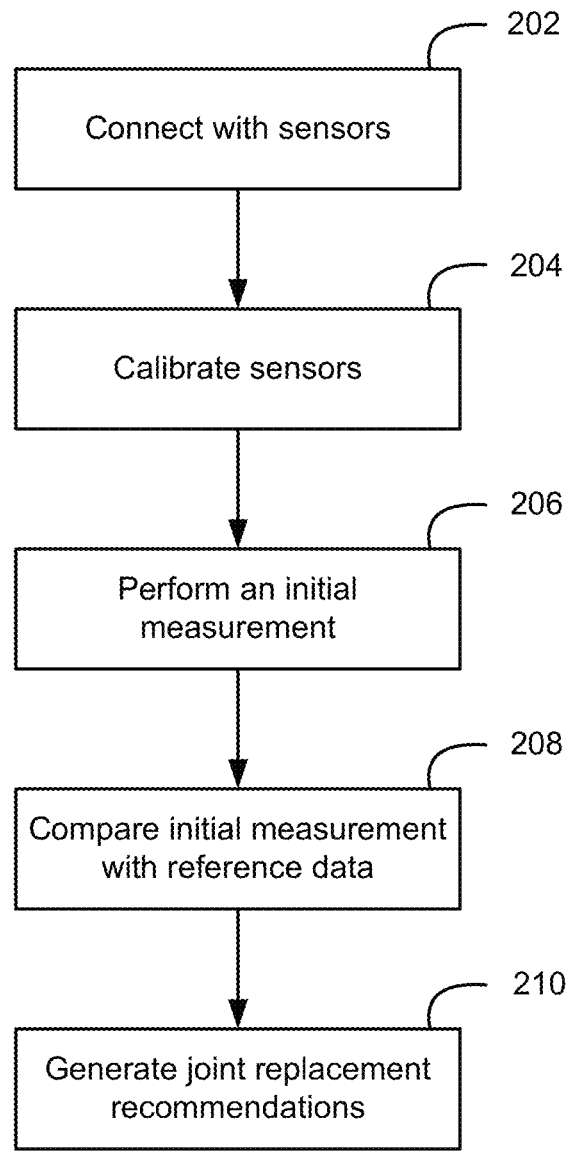
FIG. 2 illustrates a flowchart of a method for guiding joint replacement procedures based on functional stability analysis of a joint according to an embodiment of the present invention.

FIG. 2 presents a flowchart of a method for guiding joint replacement procedures based on functional stability analysis of a joint according to an embodiment of the present invention. Sensors may be worn or placed at a pair of given muscle groups corresponding to joints of an individual being treated. A client device is connected with the sensors, step 202. Connecting the client device with the sensors may include a pairing procedure. For example, a button on a given sensor may be pressed to cause a light on the sensor to flash blue indicating initiation of device pairing. Then on the client device, a pairing number or identifier may be entered into an interface to pair with the sensor. Upon successfully connecting with the sensor, the light on the sensor may change to green.

The sensors are calibrated, step 204. The client device may calibrate the sensors by instructing a user to perform several operations such as, moving forward and backward, flexing and extending a joint attached to the sensor, or rotating the joint. The client device may display an indicator, e.g., a green bar, to indicate that a calibration of the sensors was successful.

An initial measurement is performed, step 206. The initial measurement may include a preoperative testing procedure that is directed by the client device. The client device may receive a selection of a given joint, such as knee, hip, shoulder, spine, or ankle. The preoperative testing procedure may evaluate the operation, basic strength and activity level (e.g., EMG) of key muscle structures of the joint based on measurements taken by the sensors, which collectively represent functional stability of the joint. The initial measurement may comprise a recording of data values received from the sensors during the preoperative testing procedure. The preoperative testing procedure may comprise a series of dynamic testing or exercises during which the initial measurement can be recorded. The user may be instructed to, for example, walk on a treadmill, walk up and down stairs, sit down and stand up, perform resistance exercises, and fully flex and extend a joint. In the case of surgery, the preoperative testing procedure may also be repeated after surgery to compare pre- and postoperative status. According to one embodiment, the initial measurement may further include gait analysis, load distribution analysis, and motion analysis which may be performed by using special equipment, such as cameras and insoles to gather data for the analyses.

The initial measurement is compared with reference data, step 208. The reference data may include measurements from healthy people with normal muscle function. Comparing the initial measurement data with the reference data may include determining a control cohort divided in different age groups and formulating an algorithm for calculating average values of muscle activities in the patient's age. The comparison may be used by the client device to render on an interface results including muscle strength, comparison of a healthy and an affected side, and range of motion.

Joint replacement recommendations are generated based on the comparison, step 210. Generating the joint replacement recommendations may include determining and/or calculating one or more of ideal joint planes, alignment, cutting planes, implant types and sizes that are individualized to the patient based on the comparison to regain full functionality and range of motion. Deformities and pain restricted movement factors may be used as factors to generate the joint replacement recommendations. The initial measurements, comparison, and joint replacement recommendations can be used to generate a personalized avatar of the affected joint. The personalized avatar may include a preoperative view based on the initial measurement data, comparison, and optionally preoperative x-rays. The personalized avatar may further include postoperative views based on the joint replacement recommendations. The initial measurement data, joint replacement recommendations, and avatar may be rendered by the client device on a user interface.

Figure 3:
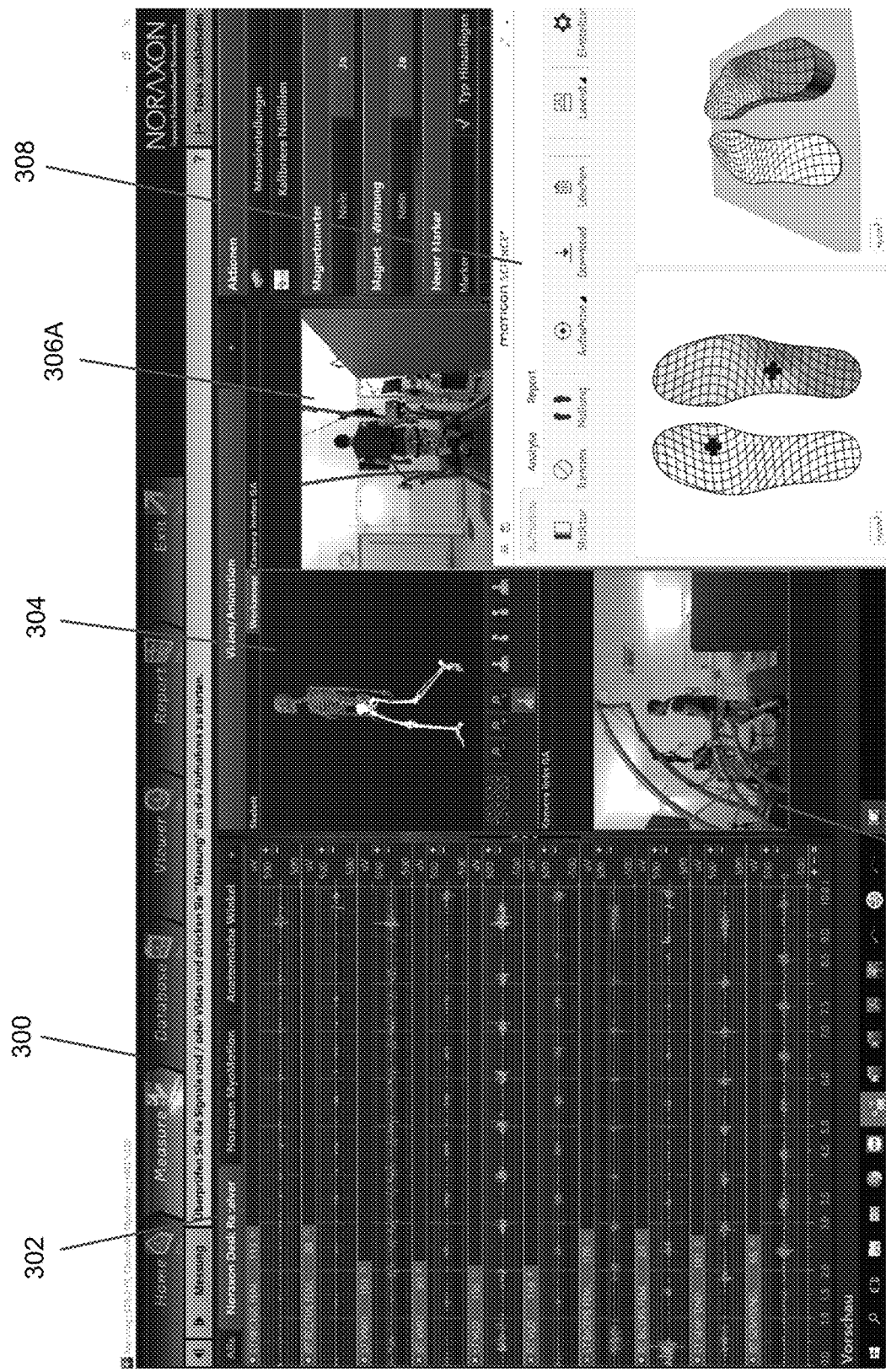
FIG. 3 illustrates an exemplary measurement user interface according to an embodiment of the present invention.

FIG. 3 presents an exemplary measurement user interface according to an embodiment of the present invention. A client device may be configured to present measurement information associated with a preoperative testing procedure. The measurement information may include data pertaining to preoperative range of motion, demand and expectation score, X-rays, load distribution analysis, gait analysis, EMG testing, and clinical facts. The user interface 300 includes EMG measurements 302, animation 304, videos 306A and 306B, and load distribution analysis 308. Videos 306A and 306B comprise video recordings of the patient performing a preoperative testing procedure (e.g., walking on a treadmill, climbing the stairs, activating the muscles against resistance). Renderings of the EMG measurements 302, animation 304, videos 306A and 306B, and load distribution analysis 308 may be synchronized to show information corresponding to a given frame of motion.

EMG measurements 302 include electrical signals detected by sensors worn by a patient at individual body parts. Animation 304 comprises a functional avatar representative of the patient's body parts that are monitored by the sensors. The functional avatar may include motion animation as well as motion analysis and gait analysis. The functional avatar may further include an overlay or parallel view of a healthy person's avatar for comparison. Additionally, the functional avatar may be rendered with an "auto correction mode" which renders the functional avatar with joint replacement recommendations, e.g., alignment/implant size/cutting planes, etc. Load distribution analysis 308 includes graphics of foot loads during gait.

FIG. 4 presents an exemplary validation user interface element according to an embodiment of the present invention. A client device may be further configured to generate information that may be used by a surgeon for joint replacement procedure planning as well as validation or correction. Implant recommendation 402 may be generated including a recommendation of implant sizes for the femur, tibia, and inlay thickness. Value 404 includes preoperative and postoperative alignment angles of the lateral distal femoral ("LDFA"), medial proximal tibial angle ("MPTA"), joint angle, and coronal alignment.

Figure 5:
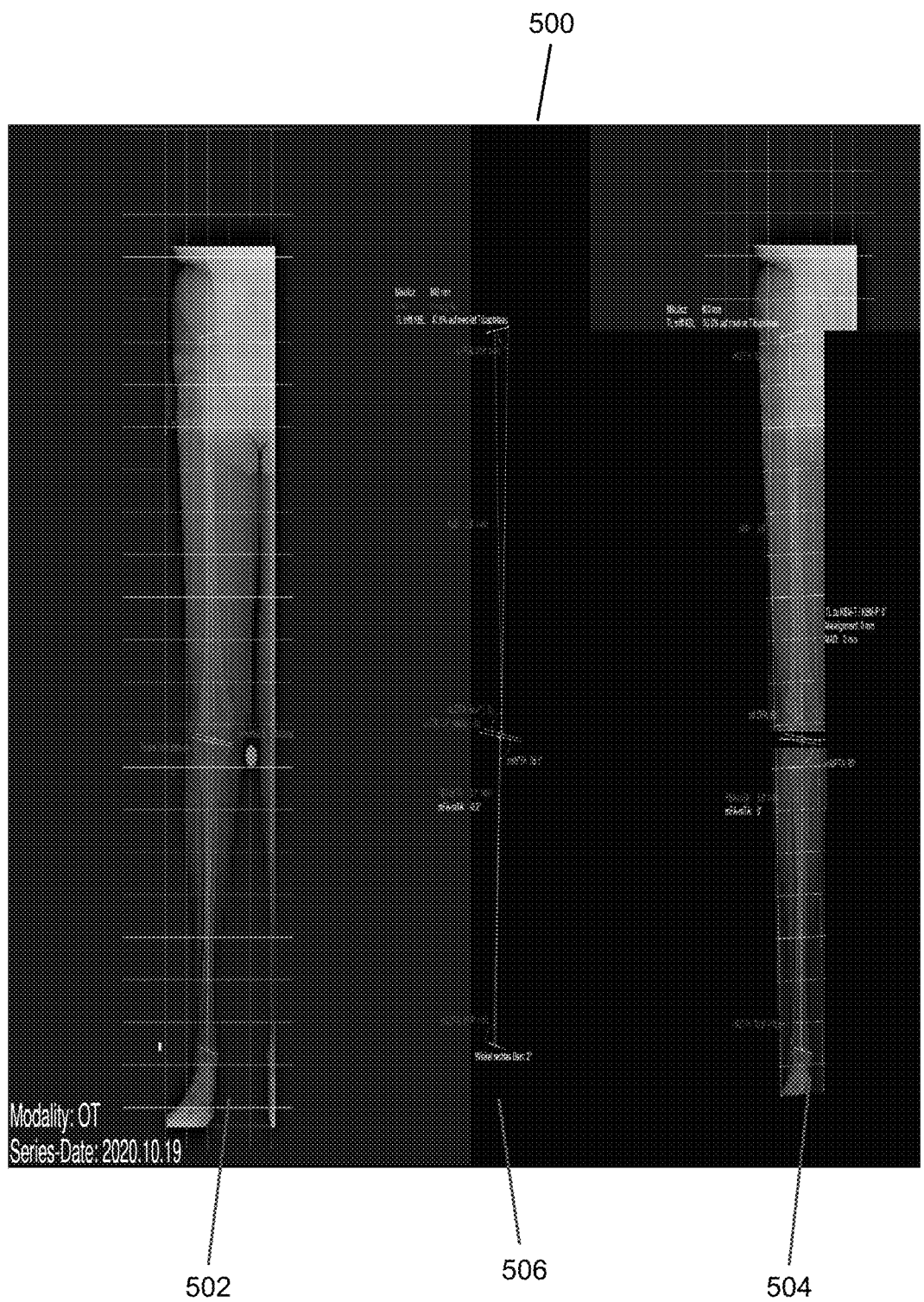

FIG. 5 presents another exemplary validation user interface element according to an embodiment of the present invention. Validation image 500 may include a preoperative x-ray view 502 of a joint, preoperative alignment angles 506, and postoperative x-ray view with alignment angles view 504.

Manual adjustments can be made by the surgeon to make corrections using the information provided in FIGS. 4 and 5 until validation is accepted. Upon validation, the information may be printed or transmitted to a three-dimensional orientation system. A summary for planned postoperative treatment such as rehabilitation may be created based on the validation.

FIGS. 1 through 5 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A method, performed by a computing device comprising a processor and a memory, for guiding joint replacement procedures based on functional stability analysis of a joint, the method comprising:

communicatively connecting, by the computing device, to a plurality of sensors worn by an individual at muscles in a tested joint area, the sensors comprising one or more electromyography sensors that measure electrical signals generated by muscle cells when electrically or neurologically activated, one or more gyro sensors that detect movement in the muscles for gait analysis, and one or more RFID sensors for pre-calculating data values based on electrical signals and data from the other sensors, the sensors being placed near a beginning and ending of a key muscle structure for the tested joint area;

calibrating the sensors through calibration procedures performed by the computing device while the individual is performing movement operations of the tested joint area;

computing, by the computing device, an initial measurement that evaluates the functional stability of the tested joint area represented by an operation, strength and activity level of the muscles, the initial measurement computed based on pre-calculated data values received from the plurality of sensors during a preoperative testing procedure;

comparing, by the computing device, the initial measurement with reference data, the reference data including measurements of healthy people with normal muscle function in the tested joint area accessed from a storage device through a server over a communication network, wherein comparing comprises determining a control cohort in the reference data divided in different age groups and formulating an algorithm for calculating average values of muscle activities in the individual's age;

generating, by the computing device, joint replacement recommendations based on the comparison;

generating, by the computing device using the initial measurement, comparison, or joint replacement recommendation, a personalized avatar representative of the individual's tested joint area, the personalized avatar comprising motion and gait analysis of the tested joint area.

2. The method of claim 1 wherein the joint replacement recommendations include one or more of ideal joint planes, alignment, cutting planes, and implant types and sizes.

3. The method of claim 1 wherein the personalized avatar includes a preoperative view based on the initial measurement and the comparison.

4. The method of claim 1 wherein the personalized avatar includes postoperative views based on the joint replacement recommendations.

5. The method of claim 1 wherein the sensors comprise a shirt, sleeves, or stocks including inwoven electromyography sensors that measure electrical signals generated by the muscles.

6. The method of claim 1 wherein the sensors comprise a belt including a receiver that wirelessly connects to the computing device and communicates the data values from the plurality of sensors to the computing device.

7. The method of claim 1 wherein the sensors are worn on the muscles in the joint area at an affected limb and at a contralateral limb.

8. The method of claim 1 further comprising transmitting the data values and the joint replacement recommendations to a three-dimensional orientation system.

9. The method of claim 1 wherein generating the personalized avatar comprises overlaying the personalized avatar with a second avatar representing a healthy person.

10. A system for guiding joint replacement procedures based on functional stability analysis of a joint, the system comprising:

a plurality of sensors comprising one or more electromyography sensors that measure electrical signals generated by muscle cells when electrically or neurologically activated, one or more gyro sensors that detect movement in muscles for gait analysis, and one or more RFID sensors for pre-calculating data values based on electrical signals and data from the other sensors, the sensors being placed near a beginning and ending of a key muscle structure for a tested joint area of an individual;

a processor; and a memory having executable instructions stored thereon that when executed by the processor cause the processor to:

communicatively connect to the plurality of sensors worn by an individual at muscles in tested joint area;

calibrate the sensors through calibration procedures performed while the individual is performing movement operations of the tested joint area;

compute an initial measurement that evaluates functional stability of the tested joint area represented by an operation, strength and activity level of the muscles, the initial measurement pre-calculated data values received from the plurality of sensors during a preoperative testing procedure;

compare the initial measurement with reference data, the reference data including measurements of healthy people with normal muscle function in the tested joint area accessed from a storage device through a server over a communication network, wherein comparing comprises determining a control cohort in the reference data divided in different age groups and formulating an algorithm for calculating average values of muscle activities in the individual's age; and generate joint replacement recommendations based on the comparison; and generate using the initial measurement, comparison, or joint replacement recommendation, a personalized avatar representative of the individual's tested joint area, the personalized avatar comprising motion and gait analysis of the tested joint area.

11. The system of claim 10 wherein the joint replacement recommendations include one or more of ideal joint planes, alignment, cutting planes, and implant types and sizes.

12. The system of claim 10 wherein the personalized avatar includes a preoperative view based on the initial measurement and the comparison.

13. The system of claim 10 wherein the personalized avatar includes postoperative views based on the joint replacement recommendations.

14. The system of claim 10 wherein the sensors comprise a shirt, sleeves, or stocks including inwoven electromyography sensors that measure electrical signals generated by the muscles.

15. The system of claim 10 wherein the sensors comprise a belt including a receiver that wirelessly connects to the computing device and communicates the data values from the plurality of sensors to the computing device.

16. The system of claim 10 wherein the sensors are configured to be worn on the muscles in the joint area at an affected limb and at a contralateral limb.

17. The system of claim 10 wherein the processor is further configured to transmit the data values and the joint replacement recommendations to a three-dimensional orientation system.

18. A system recommending joint replacement procedures based on functional stability analysis of a tested joint area of an individual, the system comprising:

a plurality of sensors communicatively connected to a computer system and comprising one or more electromyography sensors that measure electrical signals generated by muscle cells when electrically or neurologically activated, one or more gyro sensors that detect movement in muscles for gait analysis, and one or more RFID sensors for pre-calculating data values based on electrical signals and data from the other sensors, the sensors being placed near a beginning and ending of a key muscle structure for the tested joint area of the individual;

a calibration module in the computer system configured to calibrate the sensors through calibration procedures performed while the individual is performing movement operations of the tested joint area;

a storage device accessible by the computer system storing reference data including measurements of healthy people with normal muscle function in the tested joint area;

a testing module in the computer system configured to compute an initial measurement that evaluates functional stability of the tested joint area represented by operation, strength and activity level of the muscles, the initial measurement including a recording of pre-calculated data values received from the plurality of sensors during a preoperative testing procedure;

a comparison module in the computer system configured to compare the initial measurement with reference data by determining a control cohort in the reference data divided in different age groups and formulating an algorithm for calculating average values of muscle activities in the individual's age; and a recommendation module in the computer system configured to generate joint replacement recommendations based on the comparison and generate using the initial measurement, comparison, or joint replacement recommendation, a personalized avatar representative of the individual's tested joint area, the personalized avatar comprising motion and gait analysis of the tested joint area.

19. The system of claim 18 wherein the recommendation module is configured to overlay the personalized avatar with a second avatar representing a healthy person.

* * * * *